(12) United States Patent
Busch et al.

(10) Patent No.: US 7,406,888 B2
(45) Date of Patent: Aug. 5, 2008

(54) TRANSMISSION AND CLUTCH SYSTEM

(75) Inventors: Charles R. Busch, Fredericktown, OH (US); Allan E. Geyer, Marion, OH (US); Benjamin D. Peverly, Howard, OH (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 301 days.

(21) Appl. No.: 11/408,362

(22) Filed: Apr. 21, 2006

(65) Prior Publication Data

US 2007/0089553 A1 Apr. 26, 2007

Related U.S. Application Data

(63) Continuation-in-part of application No. 11/257,687, filed on Oct. 25, 2005, now Pat. No. 7,311,016.

(51) Int. Cl.
*F16H 59/00* (2006.01)
(52) U.S. Cl. ...................................... 74/335
(58) Field of Classification Search ............. 192/219.5, 192/219.4; 74/335, 339
See application file for complete search history.

(56) References Cited

U.S. PATENT DOCUMENTS 7,311,016 B2 * 12/2007 Busch et al. ............... 74/363

* cited by examiner

*Primary Examiner*—Dirk Wright
(74) *Attorney, Agent, or Firm*—Marshall & Melhorn, LLC (57) ABSTRACT

The present invention is an apparatus and method of using the apparatus having a rotatable clutch shaft, a clutch collar mounted for rotation with the shaft and a clutch yoke engaged with the clutch collar to move the collar along the shaft. A gear selection system and a clutch position system are also provided.

20 Claims, 9 Drawing Sheets

TRANSMISSION AND CLUTCH SYSTEM

CROSS REFERENCE TO RELATED APPLICATIONS

This application is a continuation-in-part application and claims benefit of U.S. patent application Ser. No. 11/257,687, filed Oct. 25, 2005, now U.S. Pat. No. 7,311,016 which is incorporated herein by reference in its entirety.

FIELD OF THE INVENTION

The present invention relates to a transmission and clutch system for a vehicle.

BACKGROUND OF THE INVENTION

Various devices for using and locking a vehicle transmission are known to those skilled in the art. Many of the locking devices are located externally from the transmission housing, such as at the wheels or at the power take off. Many of these devices also have internal cam lever and cog structures that require two clutch collars. The internal cam levers and cog structures, as well as the clutch collars, add cost and complexity to the transmission.

Examples of the prior art devices described above and others include the system shown in U.S. Pat. No. 6,856,880. In this patent, an automatic transmission with several forward gears and one reverse gear is taught. The transmission has a parking feature that uses engagement of both the forward and reverse gear trains to stop the transmission. For example, the first gear train and the reverse gear train can be engaged to prevent the output shaft of the transmission from transmitting drive to the wheels. Such an arrangement puts the input and output shafts in a double mesh state to produce a stopping force and causes the transmission to be in a parked state.

The English abstract of JP2002227999 describes a parking lock system for an automatic transmission. Based on the abstract and the figures only, the system comprises a parking gear mounted on a countershaft where the parking gear is engaged with a pawl. The pawl is engaged with structure 92. Structure 92 comprises a gear mounted on a shaft where the shaft is fixed to the transmission case. Structure 92 also comprises a spring loaded member capable of engaging and disengaging the gear with the pawl.

U.S. Pat. Nos. 6,648,093 and 6,691,815 both teach a pawl assembly mounted on a shift shaft which is connected to a gear shift lever. The pawl assembly functions as a transmission parking brake and comprises an actuating lever engagable with a park lock lever. The park lock lever engages with one of a plurality of teeth on a parking gear mounted on the rear output shaft.

The above-described prior art systems are both complex and expensive so it would be advantageous to have a simple brake feature for a transmission. It would also be advantageous to utilize a single clutch collar to reduce the cost and complexity of the transmission.

SUMMARY OF THE INVENTION

The present invention is directed toward a transmission and clutch system having a rotatable clutch shaft, a clutch collar mounted for rotation with the shaft, and a clutch yoke engaged with the clutch collar to selectively move the clutch collar axially along the shaft. The transmission and clutch system also has a gear selection system and a clutch position system. The gear selection system has a gear selection detent plate attached to a first side of the yoke and a gear selection detent capable of selective engagement with the gear selection detent plate. The clutch position system has a clutch position detent plate attached to a second side of the yoke and a clutch position detent capable of selective engagement with the clutch position detent plate.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
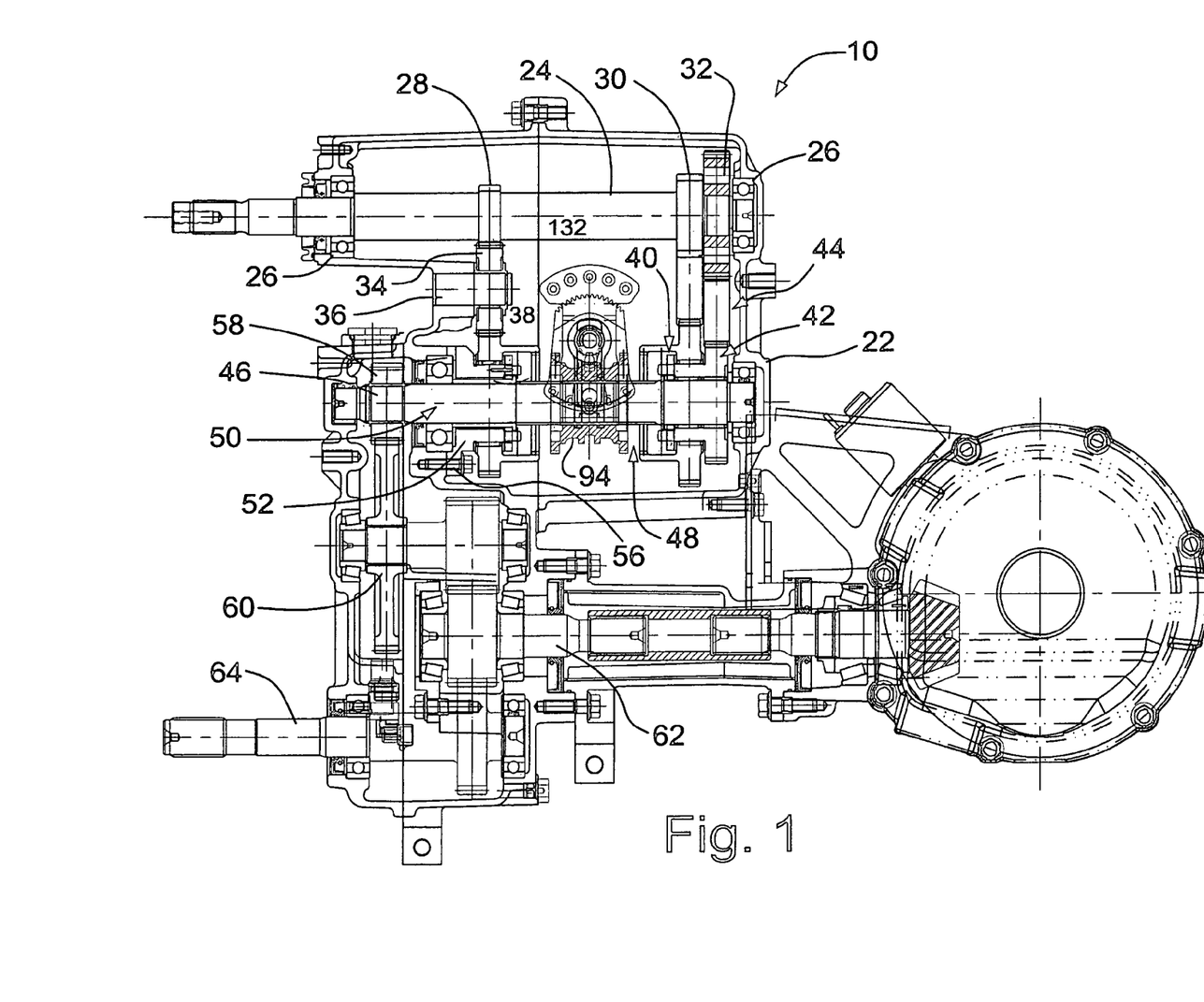
FIG. 1 is a schematic side view of a preferred embodiment of a transmission assembly of the present invention.

Referring now to FIG. 1, a transmission assembly 20 is depicted. The assembly 20 is substantially located with a housing 22. The housing 22 may be one-piece or it may be comprised of multiple pieces joined together, as known by those skilled in the art.

The assembly 20 comprises an input pinion shaft 24 mounted for rotation within the housing 22. The input pinion shaft 24 is connected to a prime mover, such as an internal combustion engine (not shown), to provide rotation to the shaft 24 in a single direction. At least two bearings 26 support the ends of the input pinion shaft 24 for rotation in the housing 22, as shown in FIG. 1.

Figure 2:
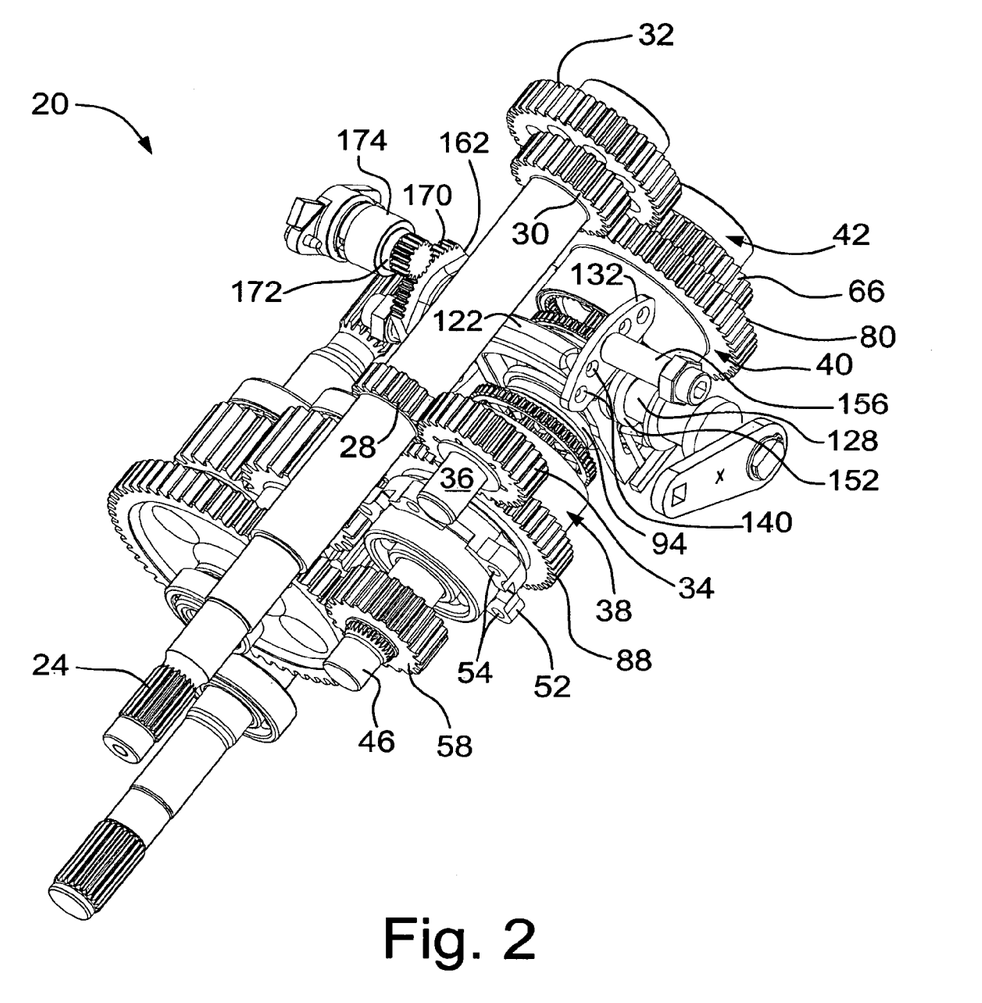
FIG. 2 is a schematic perspective view of some of the components of the transmission assembly depicted in FIG. 1.

Looking now at FIGS. 1 and 2, a reverse pinion 28, a first forward pinion 30 and a second forward pinion 32 can be seen located on the input pinion shaft 24. It can be appreciated that additional pinions can be located on the input pinion shaft 24 and the present invention is not limited to the three pinions 28, 30, 32 mentioned above.

The reverse pinion 28 is drivingly connected to a reverse idler gear 34, as shown in FIGS. 1 and 2. The reverse idler gear 34 is mounted on a reverse idler gear shaft 36 that is supported by the housing 22 for rotation. The reverse idler gear 34 is drivingly connected to a reverse shell gear 38. The reverse shell gear 38 can be seen in FIGS. 1-6. If additional reverse clutch gears are desired, the input pinion shaft 24 merely has to be provided with associated reverse pinions and reverse idler gears.

The first forward pinion 30 may be such as a forward low pinion and the second forward pinion 32 may be such as a forward high pinion. The first forward pinion 30 is drivingly connected to a forward shell gear 40 and the second forward pinion 32 is drivingly connected to a forward gear 42. Of course, if additional pinion gears are utilized, as mentioned above, additional forward shell or regular forward gears will be provided.

FIG. 1 depicts a gap 44 between the forward pinion gears 30, 32 and the forward shell gear 30 and the forward gear 42. In reality, such a gap 44 would not exist, however, it is depicted for purposes of clarity in the figure.

A rotatable clutch shaft 46, having a first end portion 48 and a second end portion 50, supports the forward shell gear 40 and the forward gear 42 for rotation about the second end portion 50. The first end portion 48 of the clutch shaft 46 supports the reverse shell gear 38.

A park flange 52 is also located about the first end portion 48 of the clutch shaft 46. The park flange 52 is stationary with respect to the reverse shell gear 38 and the clutch shaft 46. As can be seen in FIG. 2, the park flange 52 comprises a plurality of apertures 54 spaced about the perimeter of the flange 52. The apertures 54 each accept a mechanical fastener 56, such as a bolt or screw, that is secured to the housing 22, as shown in FIG. 1. The present invention, however, is not limited to securing the park flange 52 to the housing 22 with mechanical fasteners 56, but instead includes utilizing male/female couplings and similar connectors, rivets and welding to secure these to structures together.

The second end portion 50 of the shaft 46 also comprises a main pinion 58. The main pinion 58 is drivingly connected to a main gear 60, as seen in FIGS. 1 and 2. The main gear 60 is drivingly connected to a rear output pinion shaft 62 and a front output pinion shaft 64 for providing drive to one or more wheels, as known to those skilled in the art.

Figure 5:
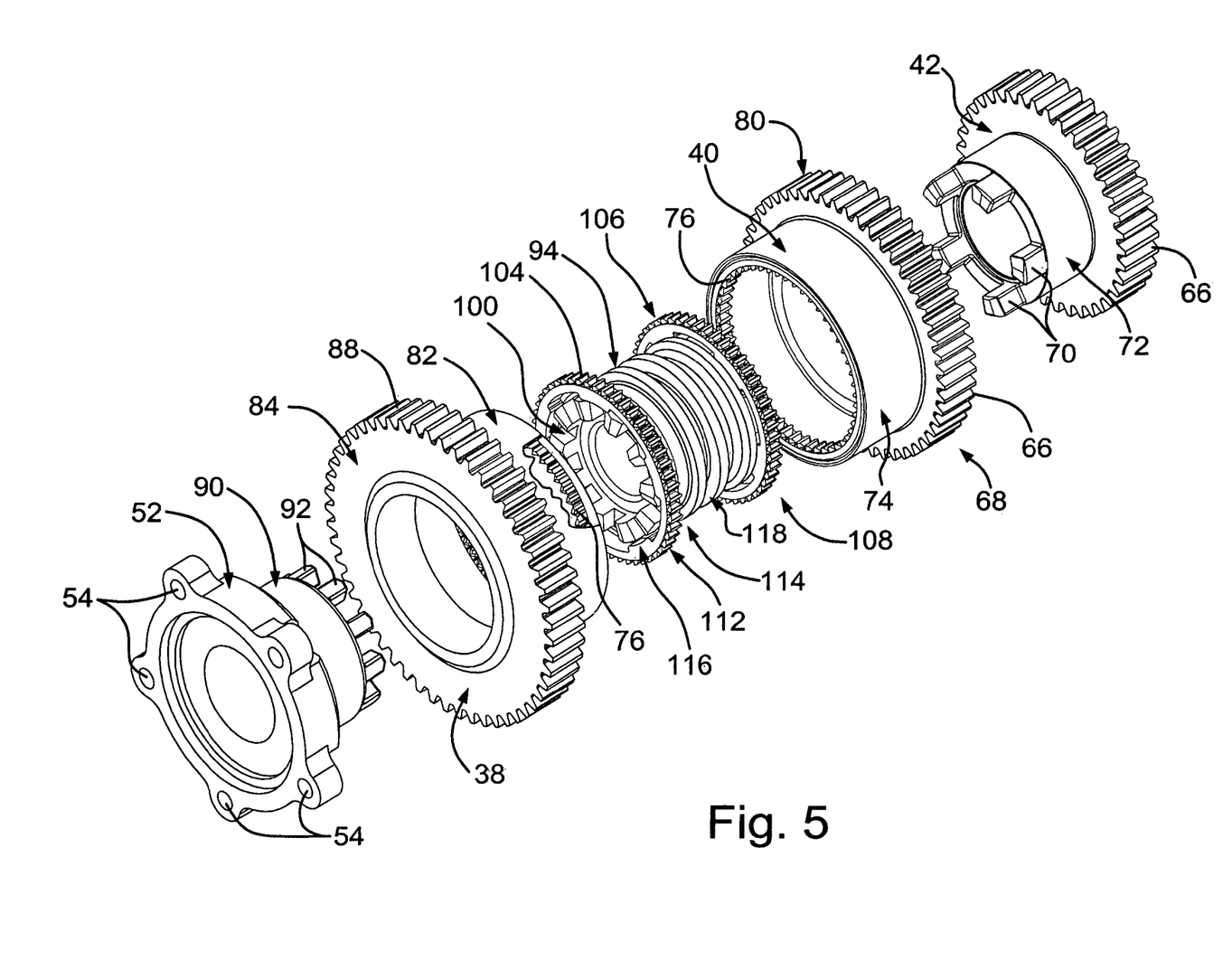
FIG. 5 is a schematic perspective view of some of the components depicted in the previous figures.
Figure 6:
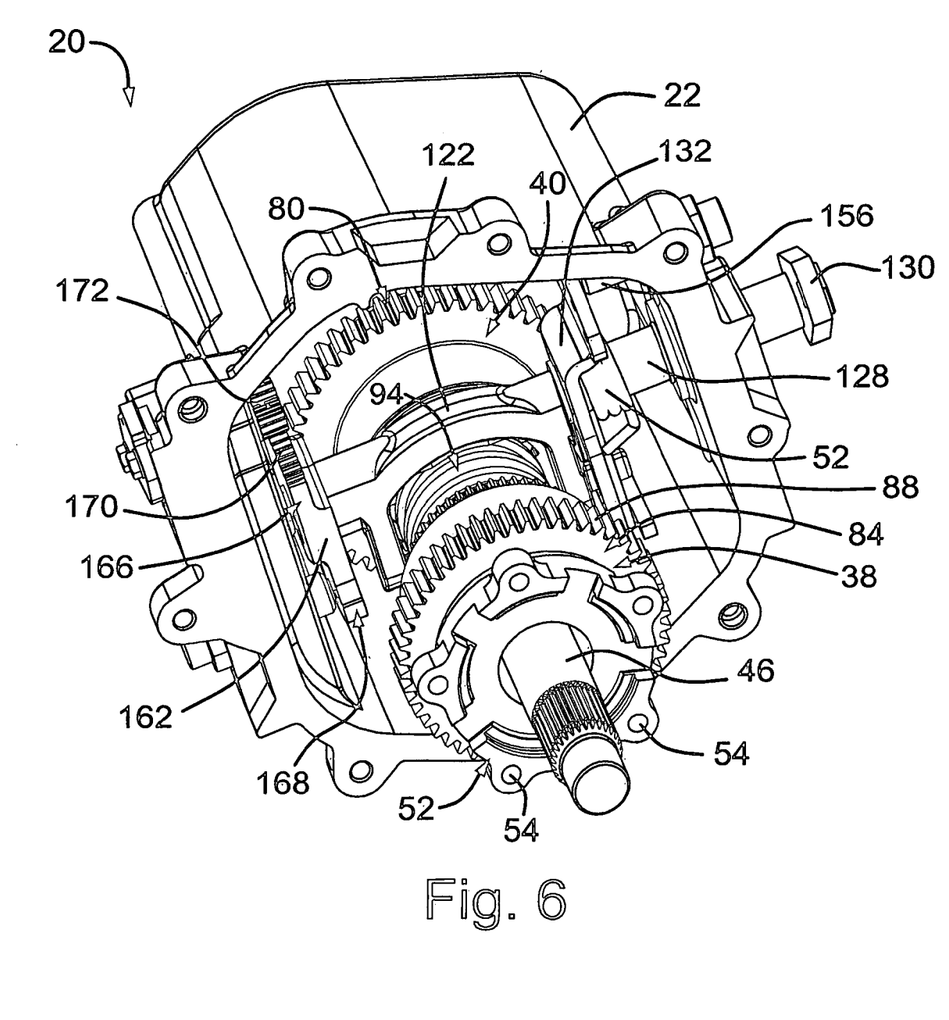
FIG. 6 is a schematic perspective view of some of the components depicted in the foregoing figures in a housing.

At least a portion of the forward gear 42 is located between the forward shell gear 40 and the shaft 46. More specifically, the forward gear 42 comprises a plurality of external teeth 66 on an increased diameter portion 68 and a set of axially extending lugs 70 on a reduced diameter portion 72, as seen in FIG. 5. The reduced diameter portion 72 fits within the forward shell gear 40.

A reduced diameter portion 74 of the forward shell gear 40 has an internal set of chamfered serrations 76. The forward shell gear 40 also comprises an increased diameter portion 78 having a plurality of external teeth 80. It can be appreciated based on FIGS. 1, 2, 3, 4 and 5, that the pluralities of external teeth 66, 80 on the increased diameter portions 68, 78 of the forward gear 42 and the forward gear shell 40 engage with the first forward pinion 30 and the second forward pinion 32, respectively.

As best seen in FIG. 5, the reverse shell gear 38 comprises a reduced diameter portion 82 and an increased diameter portion 84. The reduced diameter portion 82 has a plurality of internal chamfered serrations 86. A plurality of external teeth 88 are also located on the increased diameter portion 84. The teeth 88 are located in mesh with the reverse idler gear 34.

A reduced diameter portion 90 of the park flange 52 fits within the increased diameter portion 84 of the reverse gear shell 38. The reduced diameter portion 90 has a plurality of axially extending lugs 92.

Figure 3:
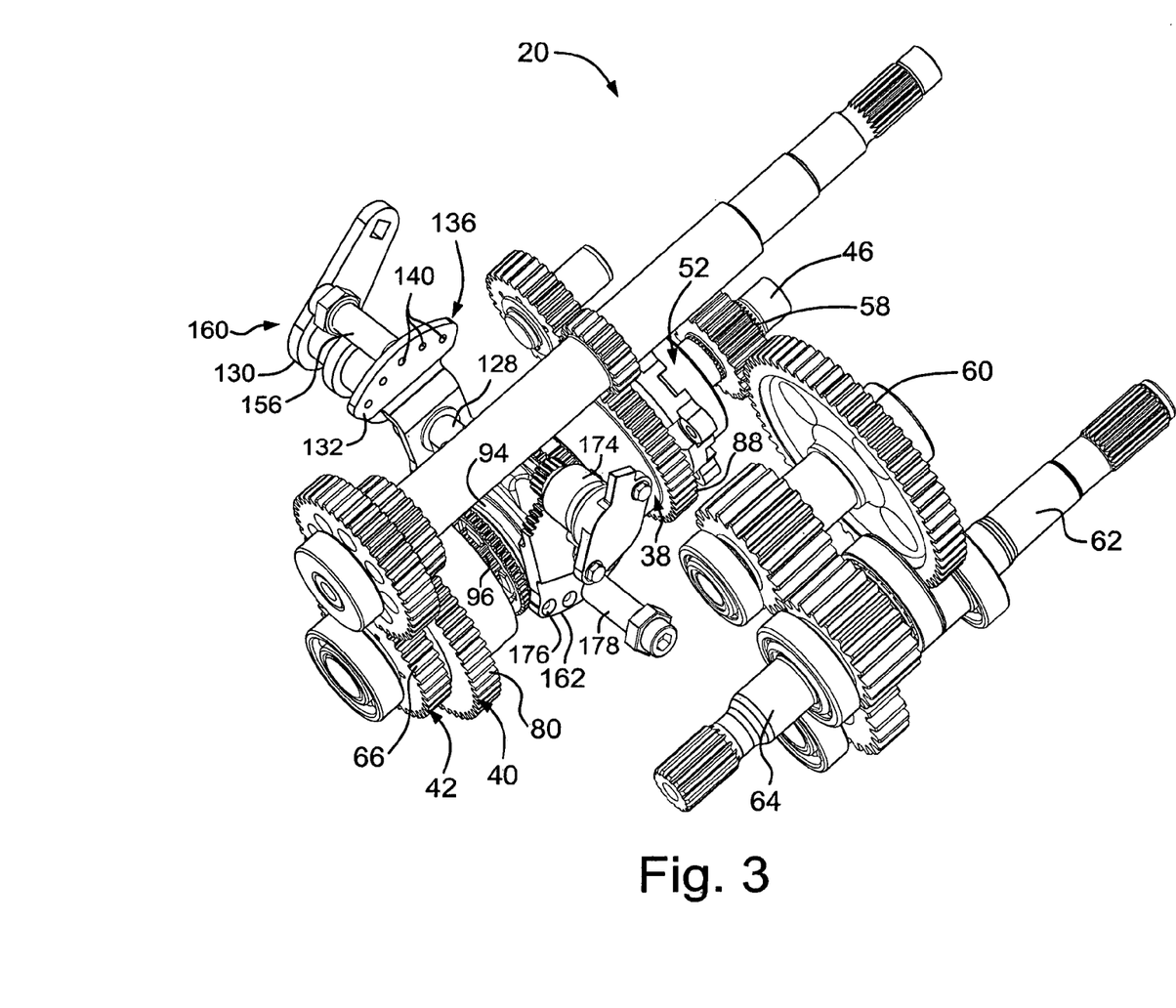
FIG. 3 is a schematic perspective view of the components depicted in FIG. 2 taken from another angle.
Figure 4:
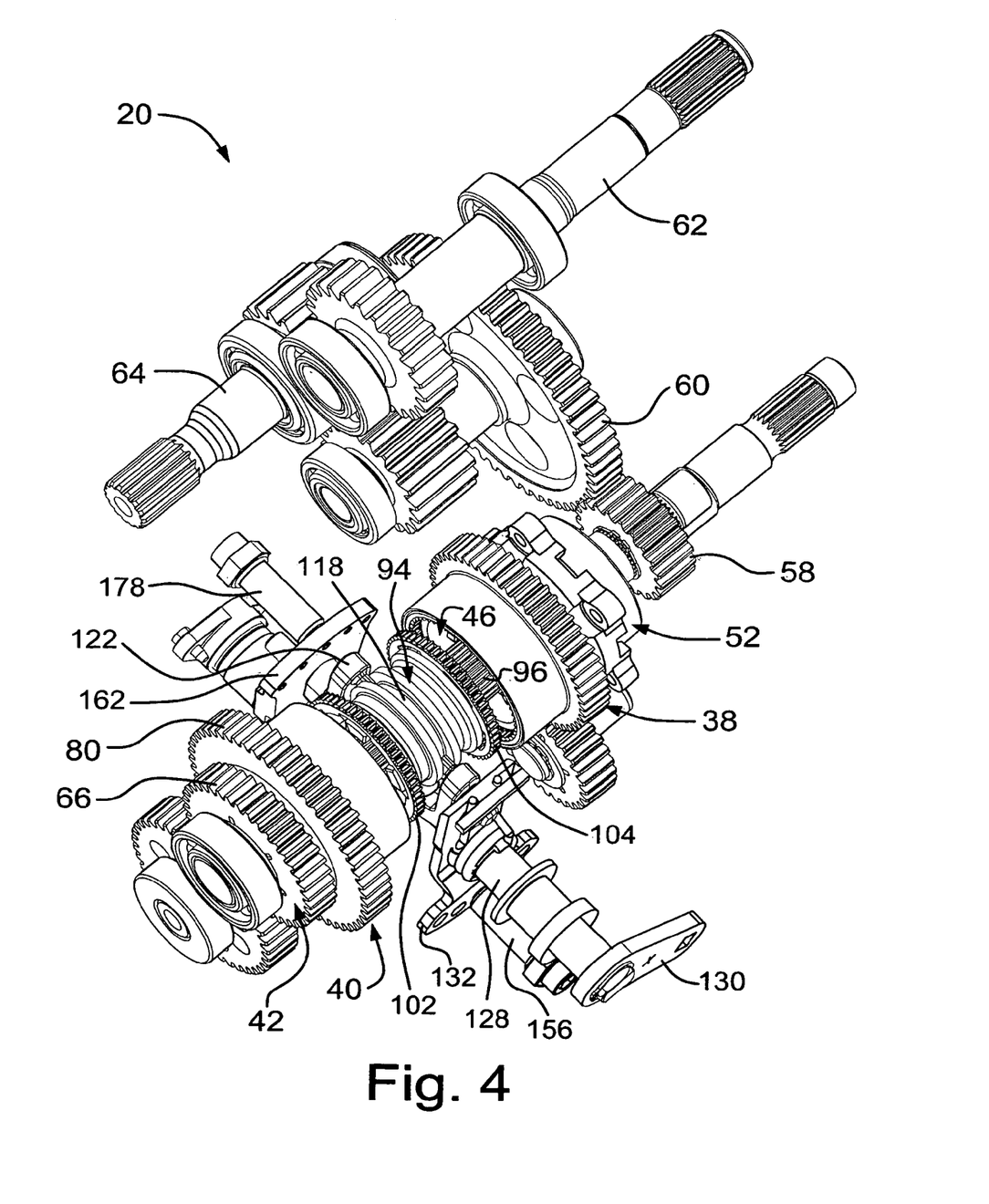
FIG. 4 is a schematic perspective view of the components depicted in FIGS. 2 and 3 as seen from a position below the components.
Figure 8:
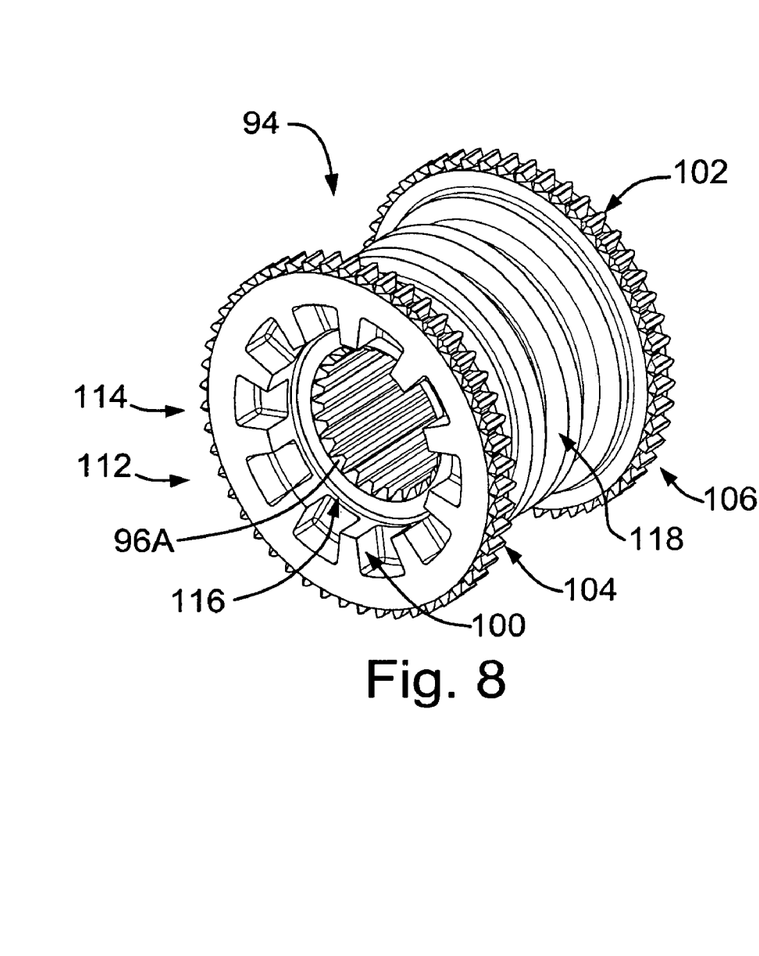
FIG. 8 is a schematic perspective view of one end of a component of the present invention.
Figure 9:
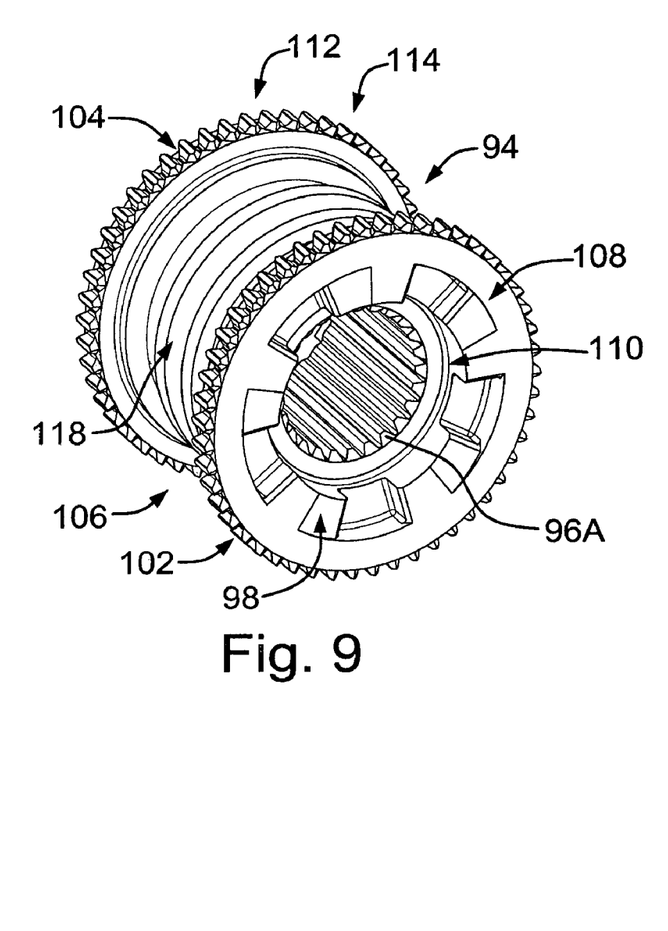
FIG. 9 is a schematic perspective view of the other end of the component depicted in FIG. 8.

A single clutch collar 94 is located on a plurality of splines 96, seen in FIGS. 3 and 4, on the shaft 46. As seen in FIGS. 8 and 9, the clutch collar 94 has its own set of splines 96A that are complementary to splines 96. With continued reference to FIGS. 8 and 9, the clutch collar 94 is comprised of a first set of lugs 98, a second set of lugs 100, a first set of chamfered serrations 102, and a second set of chamfered serrations 104. The first set of chamfered serrations 102 is located substantially about an outer periphery 106 of a first end 108 of the clutch collar 94. The first set of lugs 98 is located substantially about an inner periphery 110 of the first end 108 of the clutch collar 94. The second set of chamfered serrations 104 is located substantially about an outer periphery 112 of a second end 114 of the clutch collar 94. The second set of lugs 100 is located substantially about an inner periphery 116 of the second end 114 of the clutch collar 94.

Figure 10:
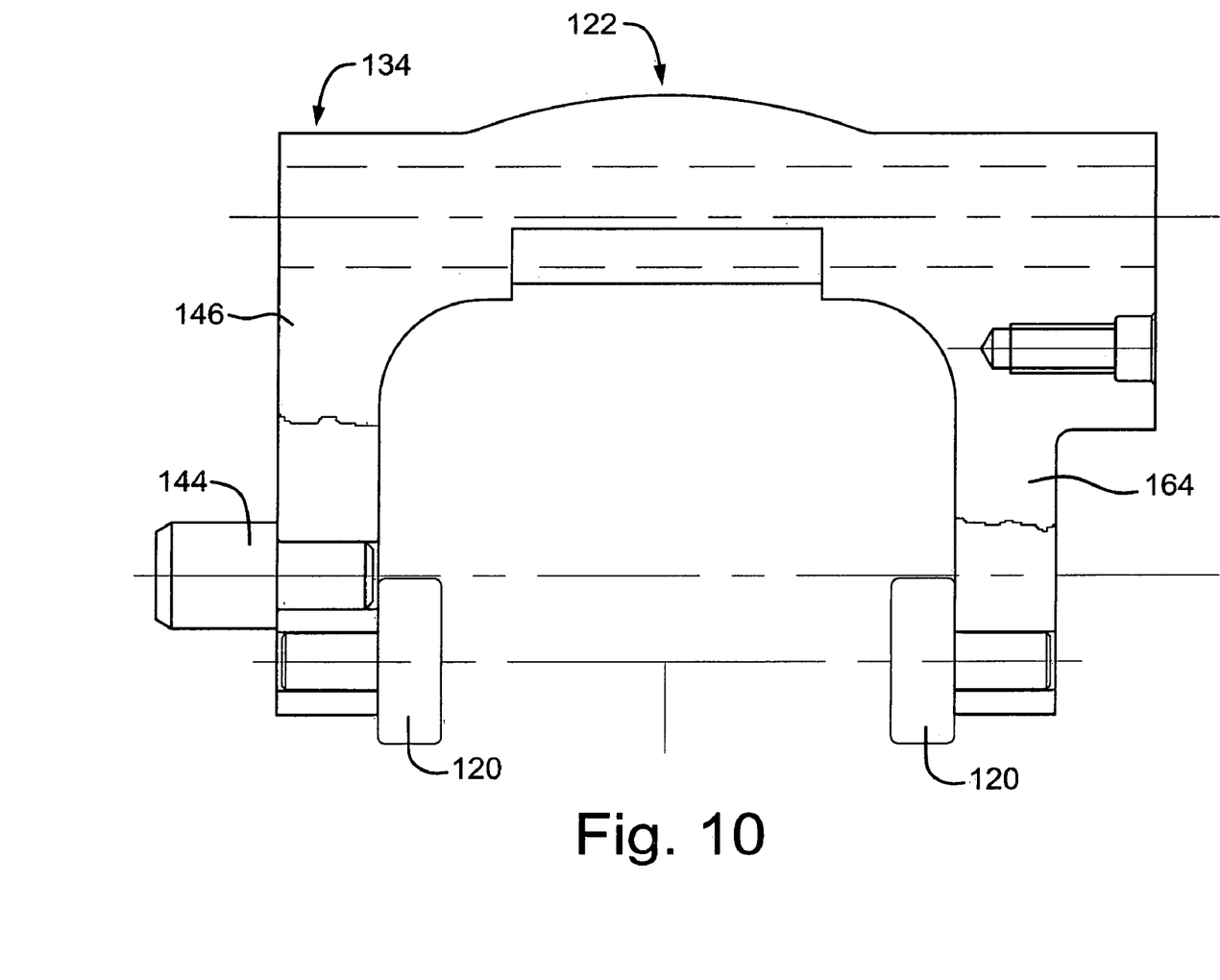
FIG. 10 is a schematic rear view of a component of the present invention.

At least one groove 118 is located about the clutch collar 94, as best seen in FIG. 5. The groove 118 receives blades 120 that inwardly depend from a clutch yoke 122. The blades 120 and clutch yoke 122 are best seen in FIG. 10. Preferably, at least two blades 120 depend from the yoke 122. While two blades 120 are discussed and depicted in the figures, it should be appreciated that additional blades can be used and/or that alternative structures, such as pegs that inwardly depend from the yoke 122, can be used without departing from the scope of the present invention. A blade-like structure is preferred, however, since it offers a large surface area to engage with the groove 118.

Preferably, the groove 118 extends continuously about the clutch collar 94 to permit the clutch collar 94 to rotate relative to the blades 120 and still provide an engagement surface for the blades 120 regardless of the orientation of the clutch collar 94.

A second embodiment (not shown) of the clutch collar 94 comprises a single rib extending substantially about the circumference of the clutch collar 94. Slotted guides are pinned to the legs, described below, of the yoke 122. The guides engage the rib. The guides pivot as the clutch collar 94 moves along the shaft 46 as the clutch collar 94 engages various gears, also described below.

Figure 7:
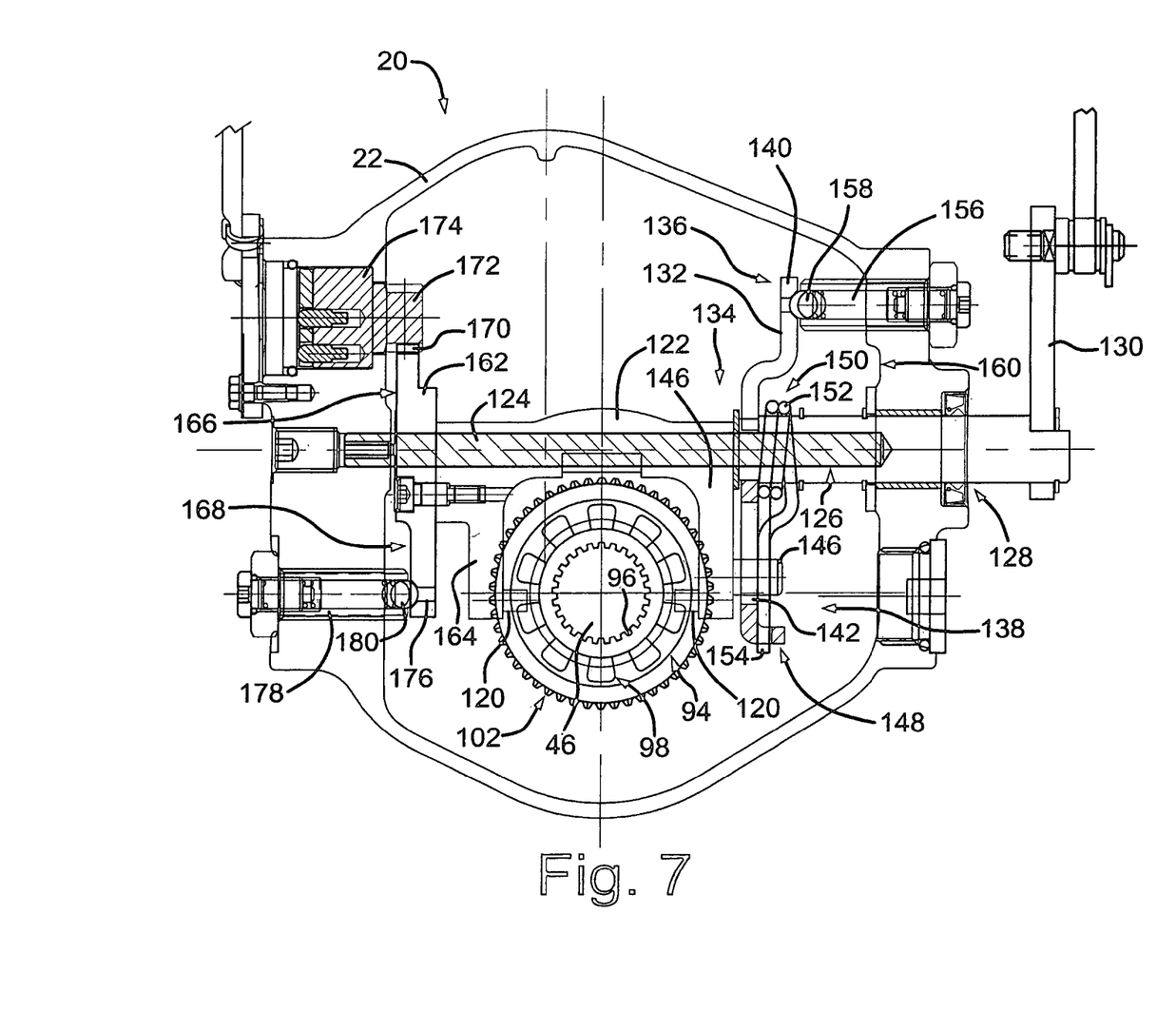
FIG. 7 is a schematic end view of the structures in FIG. 6.

Referring back to the first embodiment of the clutch collar 94, the yoke 122 is mounted for pivotal movement within the housing 22, as best seen FIG. 7. More specifically, a clutch assembly pivot pin 124 extends through the yoke 122 and is connected to the walls of the housing 22. While a clutch assembly pivot pin 124 that extends entirely through the yoke 122 is depicted in FIG. 7, it should be appreciated that the pivot pin 124 can be comprised of two or more pieces that do not extend entirely through the yoke 122 but similarly connect with the walls of the housing 22.

One end 126 of the clutch assembly pivot pin 124 is received within a shift shaft assembly 128. The shift shaft assembly 128 is supported by a wall of the housing 22. A gear actuator lever 130 is connected to the shift shaft assembly. The gear actuator lever 130 is connected directly or indirectly to an operator's compartment or area (not shown) of the vehicle. The gear actuator lever 130 is movable in a forward or a reverse direction thus causing the shift shaft assembly 128 to rotate in the housing 22 in a forward or a reverse direction.

A gear selection detent plate 132 is located on the shift shaft assembly 128 on a first side 134 of the clutch yoke 122. The gear selection detent plate 132 has an upper portion 136 and a lower portion 138. The upper portion 136 is located substantially above the shift shaft assembly 128 and it is characterized by a plurality of depressions 140 located in predetermined locations. It is within the scope of the present invention for the plurality of depressions 140 to comprise merely depressions in the surface of the detent plate 132 or to comprise apertures that extend entirely through the detent plate 132. The number of depressions 140 corresponds to the possible gearing selections of the transmission, such as forward low, forward high, neutral, reverse and park in the preferred embodiment described herein.

The lower portion 138 of the gear selection detent plate 132 is substantially located below the shift shaft assembly 128. The lower portion 138 has an aperture 142 for receiving a clutch yoke drive pin 144 that extends outwardly from a first leg 146 of the yoke 122. The lower portion 138 terminates in an outwardly extending foot 148.

A first portion 150 of a spring 152 is located about the shift shaft assembly 128. Two legs 154 depend downwardly from the spring 152. The legs 154 are bisected by the clutch yoke drive pin 144 and they contact the outwardly extending foot 148.

A gear selection detent 156 is located adjacent the upper portion 136 of the gear selection detent plate 132. The gear selection detent 156 comprises a ball 158 that is biased outwardly, such as by a spring. The ball 158 selectively engages the depressions 140 in the gear selection detent plate 132. Together, the gear selection detent 156 and the gear selection detent plate 132 comprise the gear selection system.

A clutch position detent plate 162 is located proximate a second leg 164 of the yoke 122. The clutch position detent plate 162 preferably has an upper portion 166 located substantially above the shift shaft assembly 128 and a lower portion 168 located substantially below the shift shaft assembly 128. The upper portion 168 of the clutch position detent plate 162 is comprised of a plurality of teeth 170. The teeth mesh with a timing gear 172 connected to a sensor 174. The sensor 174 may be connected to an electronic display (not shown) in the operator's compartment or area that displays the exact position of the clutch collar 94 to the operator.

The lower portion 168 of the clutch position detent plate 162 is defined by a plurality of depressions 176. It is within the scope of the present invention for the plurality of depressions 176 to comprise merely depressions in the surface of the detent plate 162 or to comprise apertures that extend entirely through the detent plate 162. The number of depressions 176 corresponds with the number of possible positions of the clutch collar 94, such as forward low, forward high, neutral, reverse and park, in the presently described embodiment.

A clutch position detent 178 is located adjacent the lower portion 168 of the clutch position detent plate 162. The clutch position detent 178 comprises a ball 180 that is biased outwardly, such as by a spring. The ball 180 selectively engages the depressions 176 in the clutch position detent plate 162. Together, the clutch position detent 178 and the clutch position detent plate 162 comprise the clutch selection system.

A preferred method of utilizing the present invention comprises providing the rotating input pinion shaft 24 with its associated reverse pinion 28 and forward pinions 30, 32 rotating therewith. The reverse pinion 28 rotates the reverse idler gear 34 which in turn rotates the reverse shell gear 38 about the clutch shaft 46. The first forward pinion 30 rotates the forward gear 42 and the second forward pinion 32 rotates the forward shell gear 40 about the clutch shaft 46. The reverse shell gear 38, the forward gear 42 and the forward shell gear 40 rotate independently from one another about the clutch shaft 46.

It can be appreciated that when the clutch collar 94 is located between the reverse shell gear 38 and the forward shell gear 40 on the clutch shaft 46 that the transmission assembly 20 is in neutral and drive is not provided to the main pinion 58 on the first end portion 48 of the clutch shaft 46.

When the vehicle operator desires to move the vehicle, for example, in forward low, he would move the gear actuator lever 130 in a predetermined direction and amount to cause the shift shaft assembly 128 to rotate a predetermined direction and amount. The gear selection detent plate 132 rotates with the shift shaft assembly 128. After rotating a predetermined amount, the gear selection detent 156 engages with the depression 140 on the gear selection detent plate 132 associated with forward low. The action of the gear selection detent 156 engaging with the depression 140 can be felt by the operator through the gear actuator lever 130.

It can be appreciated that for forward low to be engaged, the clutch collar 94 must engage with the forward shell gear 40. More specifically, the first set of chamfered serrations 102 on the outer periphery 106 of the first end 108 of the clutch collar 94 must engage with the chamfered serrations 80 on the reduced diameter portion 74 of the forward gear shell 40. At times, the chamfered serrations 102 on the clutch collar 94 and the chamfered serrations 80 on the forward shell gear 40 are not exactly aligned with one another so that they can be engaged. In this situation, the spring deflects 152 as the shift shaft assembly 128 is rotated. This permits the shift shaft assembly 128 to rotate but it delays the clutch collar 94 and the forward shell gear 40 from engaging with one another until the chamfered serrations 80, 102 are aligned. The chamfered serrations 80, 102 can be aligned with very slight rotation of the forward shell gear 40. Only slight rotation of the forward shell gear 40 is required since the width of each serration is relatively small and just a small amount of rotation will align the peaks and valleys of the serrations 80, 102 of the forward shell gear 40 and the clutch collar 94.

Once the chamfered serrations 102 on the clutch collar 94 and the forward shell gear 40 are aligned, the spring 152 causes the yoke 122, by virtue of the blades 120, to urge the clutch collar 94 toward and into engagement with the forward shell gear 40. When the chamfered teeth 80, 102 are engaged with one another, rotational power can be provided to the clutch shaft 46 from the forward shell gear 40 to the clutch collar 94.

It can be appreciated that since the clutch position detent plate 162 is attached to the pivot pin 124 that the clutch position detent plate 162 is rotated also. When the gear actuator lever 130 is moved to its predetermined location for forward low to be engaged, the clutch position detent 178 engages the depression 176 in the clutch position detent plate 162 associated with the forward low speed. The detent 178 thus locks the clutch collar 94, through the detent plate 162 and the yoke 122, into engagement with the forward shell gear 40.

The teeth 170 on the upper portion 166 of the clutch position detent plate 162 cause the gear 172 associated with the sensor 174 to turn. The sensor 174 senses this rotation and sends a signal to the display in the operator's compartment that the clutch collar 94 is properly engaged with the selected gear.

The process for engaging the forward gear 42, associated with the forward high speed of the vehicle, closely parallels engagement of the clutch collar 94 with the forward shell gear 38, thus certain steps in the process will not be discussed again. The chamfered serrations 102 of the clutch collar 94 slide through the chamfered serrations 76 of the forward shell gear 40 so that the lugs 98 on the clutch collar 94 are adjacent the lugs 70 on the forward gear 42. If the lugs 70, 98 are not aligned with one another, the spring 152 can deflect, as disclosed above, to permit the operator to move the gear actuator lever 130. The lugs 70, 98 can rotate with respect to one another until proper alignment is achieved, if they are not already aligned. Then the lugs 70, 98 engage and rotational power is provided through the forward gear 42 and through the clutch collar 94 to the clutch shaft 46.

Rotation of the gear actuator lever 130 in the opposite direction moves the clutch collar 94 toward the reverse gear shell 38. The second set of chamfered serrations 104 on the outer periphery 112 of the second end 114 of the clutch collar 94 are designed to engage with the chamfered serrations 86 on the reduced diameter portion 82 of the reverse gear shell 38. If the chamfered serrations 86, 104 are not initially aligned with one another when the operator calls for reverse to be engaged, the spring 152 operates as described above to provide an engaged gear feel to the operator through the gear selection detent 156 and gear selection detent plate 132. When the chamfered serrations 86, 104 are aligned, they engage with one another so that rotational drive is provided from the reverse shell gear 38 to the clutch collar 94 and thus the clutch shaft 46.

The present invention also comprises a park feature for the transmission assembly 20 via the park flange 52. As can be appreciated from the foregoing, when the operator wants to put the transmission assembly 20 in park, he rotates the gear actuator lever 130 to a predetermined location. The operator is provided with a physical indication of his selection of park by virtue of the gear selection detent 156 engaging with the depression 140 in the gear selection detent plate 132 corresponding to park.

The clutch collar 94 is moved along the clutch shaft 46 by the rotation of the shift shaft assembly 128 and the motion of the yoke 122. The second set of lugs 100 on the clutch collar 94 engage with the lugs 92 on the stationary park flange 52. It can be appreciated that when the lugs 92, 100 are engaged, the clutch collar 94 and thus the clutch shaft 46 is not permitted to rotate.

If the lugs 92 on the park flange 52 and the lugs 100 on the clutch collar 94 are not immediately aligned with one another when the operator desires to park the vehicle, the spring 152 deflects as described above to permit the gear actuator lever 130 to be moved into its desired position. Slight rotation of the lugs 100 on the clutch collar 94, such as by slight rotation of the vehicle wheels, aligns the lugs 92, 100 and permits the spring 152 to urge the clutch collar 94 into engagement with the park flange 52.

It can be appreciated from the foregoing that use of chamfered serrations 76, 86, 102, 104 on the reverse shell gear 38, clutch collar 94 and the forward shell gear 40 permit the clutch collar 94 to engage with the shell gears 38, 40 with almost no or none, rotation of the shell gears 38, 40. Since each chamfered serration 76, 86, 102, 104 has a relatively small width, the shell gears 38, 40 must rotate only slightly, if at all, for the serrations 76, 86, 102, 104 to align and be able to engage with one another. Thus, the transmission assembly 20 can be located in any of the above-described gear positions when the input pinion shaft 24 is not rotating.

It can also be appreciated that while the clutch shaft 46 is locked, the input pinion shaft 24 and its associated pinions 28, 30, 32, as well as the reverse shell gear 40, the forward shell gear 40 and the forward clutch gear 42 are free to rotate.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A transmission and clutch system, comprising:
    a rotatable clutch shaft;
    a clutch collar mounted for rotation with said shaft;
    a clutch yoke engaged with said clutch collar to selectively move said clutch collar axially along said shaft;
    a gear selection system comprised of a gear selection detent plate attached to a first side of said yoke and a gear selection detent capable of selective engagement with said gear selection detent plate; and
    a clutch position system comprised of a clutch position detent plate attached to a second side of said yoke and a clutch position detent capable of selective engagement with said clutch position detent plate.

2. The system of claim 1, wherein said gear selection detent plate has an upper portion and a lower portion wherein said upper portion comprises a plurality of depressions for selectively receiving said gear selection detent and said lower portion comprises a portion for receiving a spring.

3. The system of claim 2, wherein said spring comprises a first portion located about a shift shaft assembly and a second portion comprising a first leg and a second leg, said legs being received by said lower portion of said gear selection detent plate.

4. The system of claim 1, wherein said clutch position detent plate comprises an upper portion and a lower portion, wherein said upper portion comprises a plurality of teeth for engagement with a sensor and said lower portion comprises a plurality of depressions for selectively receiving said clutch position detent.

5. The system of claim 1, wherein said yoke, said clutch position detent plate, and said gear selection detent plate are mounted on a pivot pin for pivotal motion.

6. The system of claim 1, wherein said yoke is generally U-shaped, said yoke having at least two inwardly extending blades for engagement with a groove located substantially about said clutch collar.

7. A gear assembly, comprising:
    a rotatable reverse shell gear having an outer set of teeth and an inner set of chamfered serrations;
    a stationary park flange having a set of axially extending lugs;
    a rotatable and axially movable clutch collar having a first end, a second end, an inner portion and an outer portion, said inner portion of said first end having a set of lugs, said outer portion of said first end having a set chamfered serrations, said inner portion of said second end having a set of lugs and said outer portion of said second end having a set of chamfered serrations;
    a rotatable forward shell gear having a set of chamfered serrations on an inner surface; and
    a rotatable forward gear having a set of axially extending lugs;
    wherein said reverse gear shell, said forward shell gear and said forward gear are connected to a selectively rotatable input pinion shaft; and
    wherein while said input pinion shaft is not rotating said clutch collar can selectively slide into a first position so that said chamfered serrations on said first end are engaged with said chamfered serrations on said forward shell gear, or said clutch collar can slide through the chamfered serrations of said forward shell gear to a second position where said lugs on said first end of said clutch collar can engage with said lugs on said forward gear, or said clutch collar can slide to a third position where said chamfered serrations on said second end are engaged with said chamfered serrations on said reverse shell gear or said clutch collar can slide through said chamfered serrations of said reverse shell gear so that said lugs on said second end of said clutch collar can engage with said lugs on said park flange.

8. The assembly of claim 7, wherein said clutch collar can selectively slide to a neutral position between said forward shell gear and said reverse shell gear.

9. The assembly of claim 7, wherein said clutch collar engages said park flange to lock a clutch shaft on which said clutch collar moves axially.

10. A method of using a clutch system, comprising:
providing a selectively rotatable input shaft;
providing a reverse shell gear, a stationary park flange, at least one forward shell gear and at least one forward gear on a clutch shaft, said shells and said at least one forward gear being engaged with said input shaft; and
selectively engaging said reverse shell gear, said park flange, said at least one forward shell gear and said at least one forward gear with a clutch collar that is axially slidable along a clutch shaft without rotating said input shaft.

11. The method of claim 10, wherein said clutch collar is slid along said clutch shaft via pivotal movement of a clutch yoke, said clutch collar being bounded by a gear selection detent system and a clutch position detent system.

12. A method of using a transmission assembly clutch collar, comprising:
providing a rotatable, but temporarily non-rotating, input shaft that is connected to a first directional shell gear and a second directional shell gear, said first directional shell gear having a set of chamfered serrations on an inner surface and said second directional shell gear having a set of chamfered serrations on an inner surface;
providing a clutch collar having a first and a second set of chamfered serrations on an outer surface; and
passing one of said first or said second sets of chamfered serrations on said clutch collar through either of said sets of chamfered serrations on said inner surfaces of said shells without rotating said shells via said input shaft.

13. The method of claim 12, wherein said first or said second sets of chamfered serrations on said clutch collar are passed through said chamfered serrations on said directional gear shells so that either a first or a second set of lugs on said clutch collar can engage with a set of lugs on a park flange or a set of lugs on a third directional gear.

14. A method of using a transmission, comprising:
rotating a shift shaft assembly of a transmission assembly to change the speed of a vehicle or the direction of said vehicle or to put said vehicle in park;
rotating a gear selection detent plate connected to said shift shaft assembly by virtue of said rotation of said shift shaft assembly;
engaging a gear selection detent with one of a plurality of depressions in said gear selection detent plate, wherein said plurality of depressions are associated with one of a plurality of gears or a park position;
axially sliding a clutch collar along a shaft via a yoke, said yoke connected to a spring that is connected to said shift shaft assembly;
locating said clutch collar in a predetermined location for engagement with one of said plurality of gears or said park position; and
engaging a clutch position detent with a clutch position detent plate to selectively secure said clutch collar in said predetermined location.

15. The method of claim 14, wherein said spring connects said yoke with said gear selection detent plate.

16. The method of claim 14, wherein at least one blade on said yoke engages a groove on said clutch collar to urge said clutch collar along said shaft.

17. The method of claim 14, wherein a clutch position detent plate is attached to said yoke and pivots with said yoke, said clutch position detent plate having a portion for engaging with a sensor for sensing the position of said clutch collar on said shaft.

18. A clutch position sensing system, comprising:
a detent gear having an upper portion and a lower portion, where said upper portion defines a plurality of apertures therein and said lower portion is curvilinear and defines a first plurality of teeth, said detent gear being connected to a clutch yoke, said clutch yoke being connected to a shifting clutch of a transmission system;
a spring plunger for selectively and individually engaging each of said apertures in said plurality of apertures to lock said detent gear in a position; and
a sensor having a gear with a second plurality of teeth, said first and said second plurality of teeth engaged with one another, wherein said sensor determines the position of said shifting clutch by the amount and direction of rotation of the second plurality of teeth.

19. The system of claim 18, wherein said clutch yoke has a first leg and a second leg, said legs engage with said shifting clutch, and wherein said detent gear is adjacent said second leg and wherein said detent gear, said clutch yoke and said shifting clutch are all within the same transmission housing.

20. A method of shifting a transmission, comprising:
selectively rotating an actuator shaft connected to a yoke, said yoke for sliding a shifting clutch along a shaft;
pivoting a plate, said plate being connected at a first end to said actuator shaft and said plate having an aperture at a second end, to engage a peg from said yoke extending through said aperture, said aperture permitting partial rotation of said actuator shaft before said plate engages said peg;
deflecting a spring coiled about said actuator shaft when said actuator shaft is partially rotated; and
moving said shifting clutch via additional rotation of said actuator shaft via said peg engaged with said plate.

* * * * *